UNITED STATES PATENT OFFICE.

THOMAS A. EDISON, OF LLEWELLYN PARK, WEST ORANGE, NEW JERSEY, ASSIGNOR TO EDISON STORAGE BATTERY COMPANY, OF WEST ORANGE, NEW JERSEY, A CORPORATION OF NEW JERSEY.

STORAGE BATTERY.

1,167,485.  Specification of Letters Patent.  Patented Jan. 11, 1916.

No Drawing.   Application filed April 30, 1912.  Serial No. 694,247.

*To all whom it may concern:*

Be it known that I, THOMAS A. EDISON, a citizen of the United States, and a resident of Llewellyn Park, West Orange, Essex county, New Jersey, have invented certain new and useful Improvements in Storage Batteries, of which the following is a description.

In prior patents and applications I have described storage batteries in which an alkaline electrolyte is employed, and in the preferred form of which the positive elements contain alternate layers of oxids or hydroxids of nickel and nickel flake, and the negative elements contain electrolytically active iron or oxids of iron.

My present invention relates to an improved battery of a similar type, in which the active material of the positive elements consists in whole or in part of a cerium compound or compounds. My improved active material is adapted to replace the nickel hydroxid in the storage batteries described in certain of my prior patents and applications. My invention relates also to the process of preparing this material.

The process of preparing the material is as follows:—A solution of a soluble salt of cerium, as for example, sulfate of cerium, is treated with an alkali, such, for example, as caustic soda. The precipitate is washed free of the resulting salts and then dried. After the precipitate is dried it is ignited at a white heat in an atmosphere of hydrogen gas and then cooled down in hydrogen. The resulting product is then ready for use as an active material for the positive elements of alkaline storage batteries. The product is finely divided and probably consists of an oxid of cerium or a mixture of oxids of cerium.

I may utilize the active material thus prepared to form positive elements or electrodes for alkaline storage batteries by associating it in any suitable manner with conducting supports, but I prefer to load it in nickel plated perforated steel tubes supported in nickel plated steel plates or frames, such as are disclosed in my prior Patents Nos. 896,812, August 25, 1908; 940,635, November 16, 1909; and 976,792, November 22, 1910. The active material containing cerium is preferably loaded and compressed in the tubes in thin layers alternating with thin layers of nickel flake or other suitable conducting material in the manner described in my prior application Serial No. 567,371, filed June 17, 1910, upon certain features of which Patent No. 1,115,463 was granted October 27, 1914. The said patent discloses specifically alternate layers of nickel hydroxid and nickel flake, and in my present invention the cerium compound takes the place of the nickel hydroxid.

For the negative elements I may employ any suitable electrolytically active substances capable of being oxidized during discharging and of being reduced during charging in an alkaline electrolyte, but I prefer to employ negative elements containing finely divided electrolytically active iron or iron oxids. The electrolytically active material containing the iron may be prepared in the manner described in my prior Patent No. 727,118, May 5, 1903, or in my pending application Serial No. 667,366, filed December 22, 1911, or in any other suitable manner, and is preferably packed in nickel plated steel pockets supported in nickel plated steel plates or frames, such as are shown in my prior Patent No. 700,137, May 13, 1902. The elements or electrodes thus formed are assembled in a suitable container, such, for example, as a nickel plated steel can, means being provided to insulate the elements of one polarity from those of the opposite polarity. For the electrolyte I prefer to employ a solution of potassium or sodium hydroxid, to which may be added a small percentage of lithium hydroxid, as disclosed in my prior Patent No. 876,445, January 14, 1908. During the charging operation, the active material of the positive elements stores up oxygen, and the active material of the negative elements is partially or completely reduced. During discharge the active material of the negative elements is oxidized and the oxygen content of the active material of the positive elements is decreased. The positive element may be designated as the depolarizing element.

Having now described my invention, what I claim as new therein and desire to protect by Letters Patent is as follows:—

1. In a storage battery, an electrode having as a fixed part thereof active material containing a compound of cerium in undissolved condition, substantially as described.

2. An active material for the depolarizing element of an alkaline storage battery containing an oxid of cerium, substantially as described.

3. In an electrode for storage batteries, a perforated receptacle of conducting material having packed therein cerium oxid and a flake-like conducting material, substantially as described.

4. In an electrode for storage batteries, a metal perforated receptacle of conducting material having packed therein cerium oxid and flake nickel, substantially as described.

5. In an electrode for storage batteries, a perforated tubular receptacle of conducting material having packed therein cerium oxid and flake nickel in alternating layers, substantially as described.

6. The method of making an active material for storage battery electrodes, which consists in igniting a hydroxid of cerium in an atmosphere of a reducing gas, substantially as set forth.

7. The method of making an active material for storage battery electrodes, which consists in igniting a hydroxid of cerium in an atmosphere of hydrogen, substantially as set forth.

8. The method of making an active material for storage battery electrodes, which consists in precipitating a hydroxid of cerium, drying the same, and igniting the dried product in an atmosphere of hydrogen gas, substantially as set forth.

9. The method of making an active material for storage battery electrodes, which consists in precipitating a hydroxid of cerium from a solution of a soluble salt of cerium, washing and drying the precipitate, and igniting the same in an atmosphere of hydrogen gas, substantially as set forth.

10. In a storage battery, a positive element containing a compound of cerium in undissolved condition, a negative element containing electrolytically active material adapted to be oxidized during discharging and to be reduced during charging, and an alkaline electrolyte, substantially as described.

11. In a storage battery, a positive element containing a compound of cerium and flake-like conducting material, a negative element containing electrolytically active material adapted to be oxidized during discharging and to be reduced during charging, and an alkaline electrolyte, substantially as described.

12. In a storage battery, a positive element containing a compound of cerium, a negative element containing electrolytically active iron or iron oxid, and an alkaline electrolyte, substantially as described.

13. In a storage battery, a positive element containing an oxid of cerium, a negative element containing electrolytically active iron or iron oxid, and an alkaline electrolyte, substantially as described.

14. In a storage battery, a positive element containing an oxid of cerium and nickel flake, a negative element containing electrolytically active iron or iron oxid, and an alkaline electrolyte, substantially as described.

15. In a storage battery, an electrode including a conducting member and a compound of cerium retained therein and supported thereby, substantially as described.

16. In a storage battery, an electrode including a conducting support having a compound of cerium in undissolved condition fixedly associated therewith, substantially as described.

This specification signed and witnessed this 23rd day of April, 1912.

THOS. A. EDISON.

Witnesses:
HENRY LANAHAN,
ANNA R. KLEHM.